United States Patent [19]

Van Duin et al.

[11] 4,443,309

[45] Apr. 17, 1984

[54] PROCESS FOR THE DETOXIFICATION OF CHEMICAL WASTE MATERIALS

[75] Inventors: Pieter J. Van Duin, Noordwijk; Joost Van Erkel, Rozenburg, both of Netherlands

[73] Assignee: Nederlandse Centrale Organisatie voor Toegepast Natuurwetenschappelijk Onderzoek, 's-Gravenhage, Netherlands

[21] Appl. No.: 318,571

[22] Filed: Nov. 5, 1981

[30] Foreign Application Priority Data

Nov. 25, 1980 [NL] Netherlands .......................... 8006412

[51] Int. Cl.³ .............................................. C02F 1/46
[52] U.S. Cl. ................................................... 204/149
[58] Field of Search ................ 204/149, DIG. 13, 152

[56] References Cited

U.S. PATENT DOCUMENTS

| 3,766,035 | 10/1973 | Ichiki et al. | 204/149 |
| 3,816,275 | 6/1974 | Ichiki et al. | 204/149 |
| 3,959,131 | 5/1976 | Ramirez et al. | 210/44 |
| 4,104,159 | 8/1978 | Kanai | 204/149 |

FOREIGN PATENT DOCUMENTS

| 10562 | 5/1980 | European Pat. Off. |
| 1570122 | 6/1980 | United Kingdom . |

*Primary Examiner*—John F. Niebling
*Assistant Examiner*—B. J. Boggs, Jr.
*Attorney, Agent, or Firm*—Armstrong, Nikaido, Marmelstein & Kubovcik

[57] ABSTRACT

A process for the detoxification of chemical waste materials comprising toxic organic compounds in which the waste materials are subjected to electrolytical treatment by contacting them with one or more electrodes, which are part of an electric circuit, in the presence of a micelle-forming material, the anode being made of titanium or lead dioxide, the cathode being made of lead, or both being made of carbon fibers; the process being especially suitable for removing halogenated hydrocarbons from chemical waste materials.

13 Claims, No Drawings

PROCESS FOR THE DETOXIFICATION OF CHEMICAL WASTE MATERIALS

BACKGROUND OF THE INVENTION a. Field of the Invention

The present invention relates to a process for the detoxification of chemical waste materials containing toxic organic compounds in which the waste materials are subjected to electrolytical treatment.

b. Description of the Prior Art

In countries in which industrial activities take place, large quantities of chemical waste materials are produced per annum, part of which is not processed, for example because the processing is too expensive or because of lack of processing technology.

These unprocessed quantities of waste materials are stored in mines or dumped in the earth, oceans, lakes or rivers. This would not be detrimental, if these waste materials frequently did not contain substantial amounts of toxic compounds, which pose a direct threat to flora and fauna when released into the environment. For this reason, the authorities are less and less inclined to allow dumping of dangerous chemical waste materials.

A process for the electrolytical treatment of waste flows comprising toxic compounds is described in European patent application No. 10,562.

SUMMARY OF THE INVENTION

The inventors of the present invention in their study on the electrolytic treatment for the detoxification of waste materials containing toxic organic compounds have found that more selective results can be obtained with a lower consumption of energy by carrying out the electrolysis in the presence of a micelle-forming material.

One object of the present invention is to provide a process for the selective removal of toxic organic compounds from chemical waste materials through the process of electrolytic treatment of the chemical waste materials comprising toxic organic compounds in the presence of a micelle-forming material.

Another object of the present invention is to provide a process for the electrolytic treatment of chemical waste material comprising toxic organic compounds which renders the resulting liquid with a substantially lower algae toxicity and a lower mutagennity.

More specifically the present invention relates to a process for the detoxification of chemical waste materials comprising toxic organic compounds in which the waste materials are subjected to electrolytical treatment by contacting them with one or more electrodes, which are part of an electrical circuit, in the presence of a micelle-forming material.

DETAILED DESCRIPTION OF THE INVENTION

According to the process of the present invention only minor amounts of the micelle-forming material need to be added to a solution of the chemical waste material comprising toxic organic compounds. Preferably, a quantity of micelle-forming material per 1 of chemical waste material solution is used in an amount of 1–100 ppm of chemical waste material solution. The use of a micelle-forming material has resulted in a decrease in the consumption of energy of 45%.

Compounds belonging to the classes of cationic, anionic and non-ionic micelle-forming compounds may be used. Micelle-forming compounds providing best results belong to the group consisting of ethyldodecyldimethylammoniumchloride, octadecyltrimethylammoniumchloride, sodium dodecylbenzenesulfonate, dioctyl sodium sulfosuccinate, sodium perfluoroalkylbenzenesulfonate, octylphenoldecaethyleneglycol ether, methyldodecylbenzyltrimethylammoniumchloride and methyldodecylxylylene-bistrimethylammoniumchloride, or a mixture of two or more of these compounds. Preferably octadecyltrimethylammoniumchloride or a mixture of quaternary ammonium salts, known under the trade name Hyamine 2389, is used.

From experimental results, it has been surprisingly discovered that the type of electrode (anode or cathode), along which the waste material that is to be detoxified is passed, is related to the type of toxicity to be diminished or eliminated. Types of toxicity are, for example, mutagenity, genotoxicity, carcinogenity and algae toxicity (the degree of toxicity of a material to algae).

From biological experiments with algae (organisms which occur for example in oceans, lakes and rivers and which play an important part in the food-cycle), it has been surprisingly discovered that the algae toxicity decreases sharply, when the waste material is passed along the anode. In addition, the mutagenity also decreases.

The mutagenity is determined by means of the Ames-test, B. N. Ames et al, Mutation Reseach, Vol. 31, 1975, pp. 347–364. The anode material is preferably titanium or lead dioxide. The cathode material is preferably lead.

The combination of cathodic and anodic electrodes will in some cases provide an even better result, so that mutagenity and algae toxicity both decrease considerably. An electrode material of carbon fibers are preferably used. In this context the term "carbon fibers" also encompasses graphite fibers. This is a material meeting many demands. It may be, for example, pyrolytic graphite in fiber form and having a fiber diameter of $10^{-3}$ cm, the specific surface area amounting to 4000 $cm^2/cm^3$.

The process according to the present invention appears to be suitable for use in the detoxification of toxic halogenated hydrocarbons and in particular for depoisoning chlorinated hydrocarbons. Halogenated hydrocarbons, which may be treated with good results, belong to the group consisting of halogenated aromatic compounds, aliphatic compounds, phenolic compounds, aniline compounds and ethers and derivatives of halocyanides and their sulfonated products. The process according to the invention provides best results when the amount of halogenated hydrocarbons is $1-10^5$ ppm of waste material. The process may also be applied successfully for waste materials comprising toxic compounds which contain nitro groups.

The invention is further elucidated by means of the following Examples which do not constitute a limitation to the invention.

Examples 1, 2, 3 and 4 relate to a waste material consisting substantially of diluted sulfuric acid, having dissolved therein organic compouds, originating from the sulfonation, and nitration of various benzene- and napthalene derivatives, among which are also chloriated compounds. The composition of the waste material is presented below. The total concentration of dissolved organic compounds amounts to 10 g/l of waste material (10,000 ppm on waste material).

| Distribution in % by weight | |
| --- | --- |
| anthraquinonesulfonic acids | 57.7 |
| Substituted benzene- and Naphthalenesulfonic acids | 32.5 |
| oxidative and sulfonated decomposition products of phthalic acid, parachlorophenol, phthalocyanine and substituted diaminoanthraquinones | 7 |
| substituted anthraquinone derivatives | 1.3 |
| oxidative decomposition products formed during the preparation of di-/trianthrimide | 1 |
| chlorine in organic compounds at least | 0.35 |

The waste material having a toxicity with respect to the algae Phaeodactylum of 0.03%, expressed in percentage is designated as a no effect concentration, i.e., that a solution containing an amount of waste material of 0.03% by weight shows no toxic effect with respect to the algae. As a consequence of the salt content, formed during neutralization, it was not possible to measure toxicities lower than those corresponding to 1% no effect concentration.

In addition the waste material was highly mutagenic. The mutagenity was determined according to the Ames-test with the strain TA 98 of the bacterium *Salmonella typhimurium* in the presence of homogenized rat liver, obtained from rats which had been treated with Aroclor 1254. The mutagenity is designated as + or o marks in Examples 1, 2, 3 and 4. More + marks indicate a higher mutagenity, whereas the o-mark is used to indicate that no mutagenity was found.

DESCRIPTION OF THE PREFERRED EMBODIMENTS

Example 1

100 ml of the waste material were introduced into the cathode compartment of an electrochemical reactor. The cathode was made of carbon fibers and was separated from the anode compartment, comprising a platinum anode, by a membrane permeable for cations. The anode compartment was filled with 2 M sulfuric acid.

An electric current of 3 A was passed through the reactor for 30 hours. At the end of this period the algae toxicity and the mutagenity were determined. The results are shown in the Table.

Example 2

100 ml of the waste material were introduced into the anode compartment of an electrochemical reactor. The anode was made of carbon fibers and was separated from the cathode compartment, comprising a platinum cathode, by a membrane permeable for cations. The cathode compartment was filled with 2 M sulfuric acid.

An electric current of 0.3 A was passed through the reactor for 140 hours. At the end of this period the algae toxicity and the mutagenity were determined. The results are shown in the Table.

Example 3

60 ml of the waste material were introduced into an electrochemical reactor, comprising an anode and a cathode, both made of carbon fibers. This reactor thus did not contain a membrane or a diaphragm, thus allowing mixing of liquids, which had been in contact with anode and cathode. An electric current of 0.3 A was passed through the reactor for 80 hours. At the end of this period the algae toxicity and the mutagenity were determined. The results are shown in the Table.

Example 4

670 ml of the waste material were introduced into an electrochemical reactor, comprising a lead cathode and a lead dioxide anode. The reactor thus did not contain a membrane or a diaphragm, thus allowing mixing of liquids, which had been in contact with anode and cathode.

An electric current of 2.6 A was passed through the reactor for 10 hours. At the end of this period the algae toxicity and the mutagenity were determined. The results are shown in the Table.

Examples 5, 6, 7, 8 and 9 show the suitability of the present process for diminishing the concentration of toxic compounds in an aqueous solution.

TABLE

| Example | A | Duration of electrolysis (hours) | Algae toxicity (no effect concentration) | Mutagenity |
| --- | --- | --- | --- | --- |
| — | 0 | — | 0.03 | ++ |
| 1 | 3 | 30 | 0.10 | ++++ |
| 2 | 0.3 | 140 | 0.10 | +,o |
| 3 | 0.3 | 80 | 1 | o |
| 4 | 2.6 | 10 | 0.10 | o |

For comparison use is made of pentachlorophenol, a known toxic compound having an LD50 (for the rat, orally in mg/kg) of about 50.

Example 5

A solution of 0.1 M sodium sulfate, in which pentachlorophenol had been dissolved to a concentration of 50 mg/l was circulated through the cathode compartment of a circulation reactor. The cathode was made of carbon fibers. The anode was made of platinum wire netting. A solution of 0.1 M sodium sulfate was circulated through the anode compartment. The anode and cathode compartments were separated from each other by means of a diaphragm. An electric current of 2 A was passed through the reactor. The concentration of pentachlorophenol had been decreased to half the initial value after 30 min of electrolysis.

Example 6

The method of Example 5 was repeated but octadecyltrimethylammoniumchloride was added to the solution to a concentration of 6 mg/l. The concentration of pentachlorophenol had been decreased to half the initial value after 17 min of electrolysis.

Example 7

A solution of 0.1 M sodium sulfate in which pentachlorophenol had been dissolved to a concentration of 50 mg/l, was circulated through a compartment of an electrochemical circulation reactor. This compartment comprised an electrode made of carbon fibers and was separated from the other compartment by means of a diaphragm. A solution of 0.1 M sodium sulfate was circulated through this other compartment, comprising an electrode made of platinum wire netting. Through this reactor an electric current was passed, which alternated its direction every 30 sec in such a manner that alternately an anodic current of 0.1 A and a cathodic current of 0.1 A passed through the carbon fiber electrode. The concentration of pentachlorophenol had been decreased to half its initial value after 22 min of electrolysis.

Example 8

The method of Example 7 was repeated but octadecyltrimethylammoniumchloride was added to the solution to a concentration of 6 mg/l. The concentration of pentachlorophenol had been decreased to half its initial value after 15 min of electrolysis.

Example 9

The method of Example 7 was repeated but a mixture of methyldodecylbenzyltrimethylammoniumchloride and methyldodecylxylylene-bistrimethylammoniumchloride was added to the solution to a concentration of 10 mg/l. The concentration of pentachlorophenol had been decreased to half its initial value after 13 min of electrolysis.

What is claimed is:

1. A process for the detoxification of chemical waste materials containing toxic organic compounds, in which substantially all the waste materials are subjected to electrolysis by contacting them with one or more electrodes, which are part of an electric circuit, in the presence of a micelle-forming material.

2. A process according to claim 1, wherein the quantity of micelle-forming material amounts to 1-100 ppm of the waste material.

3. A process according to claim 1, wherein the micelle-forming material is a member of the group consisting of methyldodecylbenzyltrimethylammoniumchloride, methyldodecylxylylene-bistrimethylammoniumchloride, octadecyltrimethylammoniumchloride, sodium dodecylbenzenesulfonate, sodium dioctyl sulfosuccinate, sodium perfluoroalkylbenzenesulfonate, octylphenoldecaethyleneglycol ether and mixtures of at least two of these compounds.

4. A process according to claim 1, wherein the waste material is passed along the anode.

5. A process according to claim 4, characterized in that the anode is made of titanium or lead dioxide.

6. A process according to claim 1, wherein the waste material is passed along the cathode.

7. A process according to claim 6, wherein the cathode is made of lead.

8. A process according to claim 1, wherein the waste material is passed along both the cathode and the anode.

9. A process according to any one of claims 4, 6 and 8, wherein the electrode is made of carbon fibers.

10. A process according to claim 1, wherein the toxic organic compounds are halogenated hydrocarbons which are a member of the group consisting of halogenated aromatic compounds, aliphatic compounds, phenolic compounds, aniline compounds and ethers and halocyanides and their sulfonated products.

11. A process according to claim 10, wherein the quantity of halogenated hydrocarbon amounts to $1-10^5$ ppm of waste material.

12. A process according to claim 1, wherein the toxic organic compounds contain nitro groups.

13. A process according to claim 1, wherein the waste materials are circulated through at least one electrode compartment.

* * * * *